United States Patent [19]

Sindlinger et al.

[11] 4,294,493

[45] Oct. 13, 1981

[54] MAGNETIC BEARING ASSEMBLY

[75] Inventors: Rainer Sindlinger, Hirschberg; Josef Hammer, Rotenberg, both of Fed. Rep. of Germany

[73] Assignee: Teldix GmbH, Heidelberg, Fed. Rep. of Germany

[21] Appl. No.: 90,588

[22] Filed: Nov. 2, 1979

[30] Foreign Application Priority Data

Nov. 4, 1978 [DE] Fed. Rep. of Germany ....... 2847930

[51] Int. Cl.³ ............................................ F16C 39/06
[52] U.S. Cl. .................................................. 308/10
[58] Field of Search ...................... 308/10; 310/74, 153

[56] References Cited

U.S. PATENT DOCUMENTS

| | | | |
|---|---|---|---|
| 3,787,100 | 1/1974 | Habermann | 308/10 |
| 3,888,553 | 6/1975 | Wehde | 308/10 |
| 4,000,929 | 7/1975 | Studer | 308/10 |
| 4,043,614 | 8/1977 | Lyman | 308/10 |
| 4,065,189 | 12/1977 | Sikorra | 308/10 |
| 4,077,678 | 3/1978 | Studer | 308/10 |
| 4,114,960 | 9/1978 | Habermann | 308/10 |

FOREIGN PATENT DOCUMENTS

| | | | |
|---|---|---|---|
| 2655006 | 11/1977 | Fed. Rep. of Germany | 308/10 |
| 2649187 | 12/1977 | Fed. Rep. of Germany | 308/10 |

*Primary Examiner*—R. Skudy
*Attorney, Agent, or Firm*—Spencer & Kaye

[57] ABSTRACT

A magnetic bearing assembly for a rotor, including at least two actively regulated magnetic bearings for stabilizing the rotor in directions oriented substantially perpendicularly to one another and to the axis of rotation. The magnetic bearings define a bearing plane oriented perpendicularly to the axis. The rotor has a center of gravity situated at an axial distance from the bearing plane whereby tilting motions of the rotor about tilt-axes perpendicular to the axis of rotation can be sensed and counteracted.

16 Claims, 1 Drawing Figure

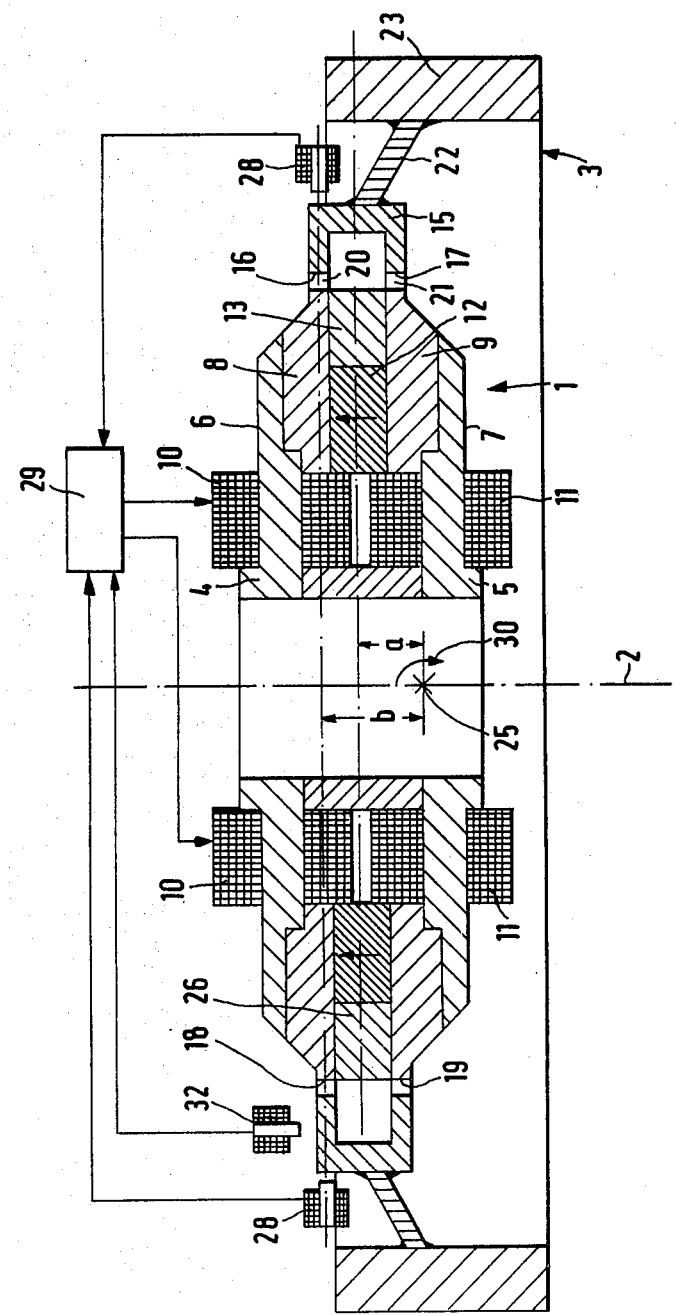

MAGNETIC BEARING ASSEMBLY

BACKGROUND OF THE INVENTION

This invention relates to a magnetic bearing assembly which has at least two actively regulated bearings for stabilizing a rotor in directions that are substantially perpendicular to one another and to the axis of rotation. The bearings are arranged substantially in a radial bearing plane.

A known bearing assembly of the above-outlined type is disclosed, for example, in German Laid-Open Application (Offenlegungsschrift) No. 2,649,182. The actively regulated magnetic bearings are provided with control coils which are energized as a fucntion of signals transmitted by sensors which, in turn, respond to the radial position of the rotor. The control coils and, in some structures, one or more permanent magnets generate a magnetic flux in the disc-shaped or ring-shaped pole pieces of the stator as well as in a particularly U-shaped rotor ring. Thus, in the annular air gaps between the pole faces of the pole pieces and the rotor ring a substantially radially oriented magnetic field prevails. Dependent upon the energization of the control coils, radially oriented forces can be exerted on the rotor ring and the entire rotor.

A magnetic bearing assembly of the above-outlined type is also generally designated as a bi-axially active bearing assembly. Axial displacements of the rotor as well as tilting motions of the rotor about the radial axes are, in contradistinction, stabilized in a passive manner. This means that non-controlled resetting forces or, as the case may be, resetting torques become effective which, similarly to forces derived from resetting springs, return the rotor from its deviated position into a desired position predetermined by the geometry of the pole pieces and the pole ring. Based on the mass of the rotor there is thus provided a system which is capable of oscillation and which is substantially undampened.

Further, a rotor supported in the above-outlined manner has characteristic natural frequencies about the radial axes, namely a precession frequency and a nutation frequency. Even at low rpm's of the rotor precessional oscillations may lead to an instability of the bearing system; the critical rpm's are, however, traversed sufficiently fast in most cases. With increasing rpm's, however, the nutational oscillations, with their increasing amplitudes, pose serious difficulties; there are thus additional measures required to ensure that the critical rpm's are traversed or that the rpm can be further augmented. Furthermore a device including a rotating member supported by two magnetic bearings is shown in the Habermann et al U.S. Pat. No. 3,787,100, whereby the magnetic bearings are disposed in an axial distance along the axis of rotation of said rotating member. Each bearing has sensing means providing signals representative of the relative position of the member with respect to said common axis of the two bearings along first and second direction perpendicular to the axis and to each other. Said signals are fed to a regulating device which is formed as a feed-back loop controls biasing means for controlling the force generating means such as control coils. The regulating device comprises several summation and subtracting circuits as well as phase advance networks having an appropriate response so that the rotating member can be centered in its normal position and precession and nutation movements can be dampered. In consequence of the two bearings disposed in an axial distance to another there is needed a great axial extension of the rotating member and a considerable constructive expense.

SUMMARY OF THE INVENTION

It is an object of the invention to provide an improved magnetic bearing assembly of the above-outlined type which ensures a stabilization of the rotor even at high rpm's and which further provides for an effective dampening of the oscillations with simple means.

This object and others to become apparent as the specification progresses, are accomplished by the invention, according to which, briefly stated, the center of gravity of the rotor is arranged at a distance from the bearing plane, so that during tilting motions of the rotor about axes which are perpendicular to the axes of rotation, controllable return forces, or as the case may be, return torques may be generated, particularly for the purpose of dampening the oscillations.

By means of the invention there is achieved above all an active dampening of the oscillations of a rotor without a need for additional means or regulating devices. By arranging, according to the invention, the rotor in such a manner that its center of gravity is situated externally of the radial bearing plane, there are generated sensor signals not only by radial motions of the rotor, but also by any tilting motion thereof. This is so because upon a tilting of the rotor about a radial axis there occurs in the other radial direction a radial motion which generates a corresponding sensor signal. By means of the regulating device which is present in any event and which in some instances may be modified, as well as by means of the control coils there is exerted a radial force on the rotor and, by virtue of the distance of the bearing plane from the center of gravity of the rotor, a resetting torque is generated which opposes the tilting motion. Thus, with a very slight structural modification it has become possible to dampen even high-frequency tilting oscillations, particularly nutational oscillations. Stated differently, the magnetic bearing assembly according to the invention has the dampening characteristics and the stability of a magnetic bearing assembly actively regulated along four axes, while structurally it is not more complex than a bi-axially actively regulated magnetic bearing assembly.

Preferably, additional frequency-dependent circuits are provided in the regulating device associated with the two radial directions to ensure an effective dampening for the respective critical rpm's. The number of sensors, output stages and control coils on the other hand, corresponds to a bi-axially actively regulated bearing assembly. Since at the relatively high nutational frequencies even small resetting forces may lead to an effective dampening of oscillations, the above-discussed distance of the center of gravity of the rotor from the bearing plane need not be particularly large and consequently the rotor too, can be structured in a known manner.

Further, it is particularly advantageous to arrange the sensors in an even greater distance from the center of gravity of the rotor, to ensure that the signals generated by the tilting motions of the rotor are relatively large; in this manner it is feasible to work with a correspondingly small amplification in the regulator. For reasons of stability the magnetic bearings and the sensors are arranged, with repect to the center of gravity of the rotor, on the same side of the rotational axis.

BRIEF DESCRIPTION OF THE DRAWING

The sole FIGURE is a schematic axial sectional view of a preferred embodiment of the invention.

DESCRIPTION OF THE PREFERRED EMBODIMENT

Turning now to the FIGURE, there is shown a stator part 1 and a rotor 3 rotatable about a rotational axis 2. The stator part 1 contains two pole pieces constituted by respective rings 4 and 5 which are disposed in radial planes oriented perpendicularly to the rotary axis 2. Each ring 4 and 5 has respective radially oriented extensions 6 and 7 as well as pole shoes 8 and 9 which are situated externally with repect to the radial direction. Each ring 4 and 5 has four respective extensions 6 and 7 which are spaced at 90° from one another as viewed in the circumferential direction. With each respective extension 6 and 7 there is associated a sector-shaped pole shoe 8 and 9 respectively, each extending over an angular range of approximately 90°. On the extensions 6 there are inserted four control coils 10, while the extensions 7 carry four control coils 11. Between the pole shoes 8 and 9 there is situated an inexpensive, axially magnetized permanent magnet 12 as well as a support ring 13 which ensures a secure support and alignment of the pole pieces. The stator part 1 is surrounded by a soft magnetic rotor ring 15 which has an essentially U-shaped cross section. The rotor ring 15 is rotatable about the rotary axis 2, and has annular pole faces 16 and 17. In this manner at the associated pole faces 18 and 19 of the respective pole shoes 8 and 9 there are defined annular air gaps 20 and 21. In an alternative, non-illustrated variant, the rotor ring may have a particularly axially magnetized permanent magnet ring between soft magnetic rings with corresponding pole faces.

An annular flywheel mass 23 is connected, preferably by means of web members 22, with the rotor ring 15. The center of gravity 25 of the rotor constructed in the above-described manner, is located—as seen in the drawing—on the rotary axis 2. The pole shoes 8, 9 and the rotor ring 15 are arranged symmetrically with respect to a radial plane 26 which thus constitutes the bearing plane. The center of gravity 25 is at an axial distance a from the radial bearing plane 26.

Further, sensors 28 are provided for emitting signals which characterize the radial position of the rotor ring 15 (and thus that of the rotor 3) and which are connected with a regulator device 29 for controlling the control coils 10, 11. In principle, the sensors 28 may be arranged in the bearing plane 26; preferably, however, they are situated in a radial plane which has a distance b from the center of gravity 25. The outer cylindrical face of the rotor ring 15 is associated with the sensors 28 as a reference surface. In the drawing two sensors 28 are shown which respond to the position or motion of the rotor ring 15 in the radial direction lying in the plane of the drawing. Such sensors are also arranged for responding to motions in the other radial direction which is oriented perpendicularly to the drawing plane. The control coils 10, 11 are energized as a function of the signals generated by all the sensors 28.

In the description which follows, the mode of operation of the above-described magnetic bearing assembly will be set forth.

By virtue of the permanent magnets 12 as well as the sector-shaped pole shoes 8 and 9 in the annular air gaps 20 and 21, substantially homogeneous, radially oriented magnetic fields are generated since the magnetic flux of the permanent magnets 12 flows across the pole shoe 8, the air gap 20, the rotor ring 15, the air gap 21 and the pole shoe 9. Corresponding magnetic fields can be generated with a single permanent magnet ring arranged on the stator 1 and/or by means of a permanent magnet ring mounted on the rotor ring 15. It is also feasible to generate such a magnetic field by means of the control coils 10 and 11 by passing therethrough constant direct currents. In all these variants, by virtue of the magnetic fields in the air gaps 20 and 21, magnetic pulling forces are generated between the stator 1 and the rotor ring 15. These forces initially effect a passive, non-regulated stabilization of the rotor in the radial and axial direction and in case of tilting motions of the rotor. In both radial directions an unstable condition of equilibrium prevails in the position of rest.

In addition to the above-noted passive stabilization, by means of the control coils 10 and 11 an actively regulated rotor stabilization is effected as will be now discussed for that radial direction which lies in the drawing sheet. The same active regulation applies also for the other radial direction which is perpendicular to the sheet of the drawing.

If, for example, under the effect of external forces the rotor 3 moves from the illustrated desired position towards the right as viewed in the drawing, the diametrically oppositely located sensors 28 generate signals which are applied to the regulating device 29. By means of the illustrated control coils 10 and 11 or at least by one of these coils there is generated a magnetic flux (that is, a magnetic field) which is superposed on the permanent magnetic field prevailing in the air gaps 20, 21. The control coils are so energized that the magnetic field increases on the right side (as viewed in the drawing) and weakens on the left side. In this manner there is generated a radially oriented force component for returning the rotor 3 into its illustrated desired position. Thus, there is effected an actively (positively) regulated stabilization of the rotor in both radial directions.

By virtue of the concentric design of the pole faces 16, 17 as well as 18, 19, during the motion of the rotor 3 in the direction of the rotary axis 2 there are generated magnetic return forces, that is, the rotor is passively stabilized in the axial direction.

According to important features of the invention, the center of gravity 25 of the rotor 3 is arranged at a distance a from the bearing plane 26 and at a distance b from the rdial plane of the sensors 28. In this manner it is achieved that during tilting motions of the rotor 3 which occur substantially about radial axes passing through the center of gravity and which are derived particularly from nutational oscillations, there can be generated oppositely oriented return torques by means of the magnetic bearing assembly according to the invention. If, for example, the rotor 3 executes a small tilting motion in the direction of the arrow 30, the distance of the rotor ring 15 from the right hand sensor 28 will decrease and, at the same time, its distance from the left hand sensor 28 will increase. Thus, the tilting motion leads to corresponding signals generated by the sensors 28. As a function of these signals the control device 29 energizes the control coils 10 and 11 so that on the rotor 3 there will now be exerted, as a function of the distance a, return torques which oppose the tilting motion. In this manner, particularly high-frequency tilting motions or tilting oscillations caused by nutations can be effectively dampened.

Since such tilting oscillations appear in predetermined rpm ranges, dependent on the design of the rotor and/or the rigidity of the bearing assembly, it is of advantage to design the frequency-dependent circuits in the regulating device 29 in such a manner that in addition to the dampening of pure radial oscillations, there can be achieved also a dampening of the tilting oscillations in the respective rpm ranges. For this reason the phase lead of the regulating device 29 is increased or several circuits with phase lead are connected in series so that there is obtained a substantially constant phase lead over a wide frequency range. In case it is desired to omit such a wide-band regulation, it is of advantage to provide in the regulating device 29 a narrow-band filter which phase lead in order to effectively dampen nutational oscillations at the corresponding frequency. This is based on the recognition that in a substantially disc-shaped or ring-shaped rotor 3 disturbances which are caused, for example, by dynamic imbalance and which orbit with rpm speed, do not generate nutational oscillations. In contradistinction, disturbances which orbit with an rpm of integer harmonics of the rotational frequency and are cused, for example, by irregularities of the reference surface of the rotor 3 associated with the sensors 28, may generate nutational oscillations in a narrow frequency range. Such oscillations can be effectively dampened with a narrow-band filter having a phase lead.

As seen in the drawing, the radial plane in which the sensors 28 are situated has, from the center of gravity 25, a distance b which is greater than the distance a between the center of gravity and the bearing plane 26. By means of this arrangement it is achieved that the radial displacement to which the sensors 28 respond and which is derived from the tilting motions is greater than if the sensors 28 were also located in the bearing plane 26. It is noted that both sensors 28 and the bearing plane 26 are located, for reasons of stability, on the same side of the rotary axis 2 with respsect to the center of gravity 25.

In all cases it is of advantage to work with as large sensor signals as possible to avoid regulations with excessively large amplifications, because, if large amplifications have to be resorted to, disturbances, for example, caused by irregularities in the reference faces associated with sensors 28 lead to relatively large bearing forces and thus effect unnecessarily high energy losses. For this reason it is very advantageous to select the distance b relatively large and to arrange the reference surface of the ring 15 and the sensors 28 at an even greater distance from one another than shown in the drawing. Thus, according to a further feature of the invention, additional sensors 32 (only one shown) are provided for responding to tilting motions such that relatively large axial displacements can be sensed.

It will be understood that the above description of the present invention is susceptible to various modifications, changes and adaptations, and the same are intended to be comprehended within the meaning and range of equivalents of the appended claims.

What is claimed is:

1. In a magnetic bearing assembly for a rotor having an axis of rotation; the assembly including at least two actively regulated magnetic bearings for stabilizing the rotor in radial directions oriented substantially perpendicularly to one another and to said axis; said magnetic bearings defining a bearing plane oriented perpendicularly to said axis; means for sensing radial motions of said rotor and emitting first signals in response to said radial motions; and force generating means for applying to said rotor radial return forces as a function of said first signals; the improvement wherein said rotor has a center of gravity situated at an axial distance from said bearing plane whereby tilting motions of said rotor about tilt-axes perpendicular to said axis of rotation can be sensed; further comprising sensors for sensing said tilting motions of said rotor and emitting second signals in response to said tilting motions; said sensors being situated at an axial distance from said bearing plane; said force generating means applying to said rotor, as a function of said second signals, return forces opposing said tilting motions of said rotor.

2. A magnetic bearing assembly as defined in claim 1, wherein said sensors comprise said means for sensing said radial motions.

3. A magnetic bearing assembly as defined in claim 1, wherein said actively regulated magnetic bearings comprise control coils for generating radial bearing forces; said force generating means comprising said control coils.

4. A magnetic bearing assembly as defined in claim 1, further comprising at least two additional sensors each associated with a separate one of said tilt-axes for responding substantially to axial displacements and said tilting motions of said rotor.

5. A magnetic bearing assembly as defined in claim 2, wherein said sensors are arranged in a radial plane and further wherein the axial distance between said radial plane and said center of gravity is greater than the axial distance between said bearing plane and said center of gravity.

6. A magnetic bearing assembly as defined in claim 1, wherein said rotor includes a rotor ring aligned with said bearing plane and a substantially annular flywheel mass axially offset with respect to said bearing plane, and connecting means affixing said flywheel mass to said rotor ring.

7. A magnetic bearing assembly as defined in claim 6, wherein said connecting means comprises web members.

8. A magnetic bearing assembly as defined in claim 3, wherein said sensors comprise said means for sensing said radial motions; said magnetic bearings, said sensors and said control coils being arranged at the same side of said axis of rotation with respect to said center of gravity.

9. A magnetic bearing assembly as defined in claim 3, wherein said control coils are at least two in number; further comprising two axially spaced pole pieces arranged symmetrically with respect to said bearing plane; each said pole piece having circumferential pole faces; said rotor including a rotor ring having a U-shaped cross section and including circumferential pole faces; said pole faces of said pole pieces define annular air gaps with said pole faces of said rotor ring.

10. A magnetic bearing assembly as defined in claim 9, wherein each said pole piece includes a ring-shaped member having radially oriented projections; said control coils being inserted on said projections; pole shoes in engagement with said projections; and a support ring disposed between the pole shoes.

11. A magnetic bearing assembly as defined in claim 9, further comprising an axially magnetized permanent magnet means situated between said pole pieces.

12. A magnetic bearing assembly as defined in claim 11, wherein said permanent magnet means comprises a permanent magnet ring.

13. A magnetic bearing assembly as defined in claim 11, wherein said permanent magnet means comprises four rectangular permanent magnets circumferentially spaced about said axis of rotation.

14. A magnetic bearing assembly as defined in claim 3, wherein said sensors comprise said means for sensing said radial motions; further comprising a regulating device connected to said sensors for receiving said first and second signals from said sensors; said control coils being connected to said regulating device for receiving coil-energizing signals from said regulating device as a function of the signals emitted by said sensors; said regulating device including frequency-dependent circuits for dampening purely radial oscillations and nutational oscillations of said rotor.

15. A magnetic bearing assembly as defined in claim 14, further wherein said regulating device includes means for effecting substantially uniform phase lead over a wide frequency range.

16. A magnetic bearing assembly as defined in claim 14, further wherein said regulating device includes at least one narrow-band filter with phase lead; said filter having a frequency range corresponding to the frequency of nutational oscillations of said rotor.

* * * * *